United States Patent
Hearn et al.

(10) Patent No.: US 7,104,570 B2
(45) Date of Patent: Sep. 12, 2006

(54) LOW MOUNT SEAT BELT GUIDE LOOP

(75) Inventors: Robert Hearn, Farmington Hills, MI (US); Alex Van Duyne, Flint, MI (US); Jeannine Schubring, Shelby Township, MI (US); Vivek Naik, Southfied, MI (US); Daniella Canning, Troy, MI (US)

(73) Assignee: Lear Corporation, Southfield, MI (US)

( * ) Notice: Subject to any disclaimer, the term of this patent is extended or adjusted under 35 U.S.C. 154(b) by 357 days.

(21) Appl. No.: 10/736,442

(22) Filed: Dec. 15, 2003

(65) Prior Publication Data

US 2005/0127659 A1 Jun. 16, 2005

(51) Int. Cl.
 *B60R 22/00* (2006.01)
(52) U.S. Cl. ................................. 280/801.1; 297/481
(58) Field of Classification Search ............ 280/801.1, 280/808; 297/483, 468, 481; B60R 22/26
See application file for complete search history.

(56) References Cited

U.S. PATENT DOCUMENTS

| | | | | |
|---|---|---|---|---|
| 3,567,247 A | * | 3/1971 | Sobkow et al. ............. | 280/808 |
| 4,461,510 A | * | 7/1984 | Cunningham et al. ... | 297/250.1 |
| 4,549,769 A | | 10/1985 | Pilarski | |
| 4,549,770 A | | 10/1985 | Kurtti | |
| 4,648,625 A | * | 3/1987 | Lynch ........................ | 280/808 |
| 4,832,366 A | * | 5/1989 | Corbett et al. .............. | 280/808 |
| 5,060,976 A | * | 10/1991 | Boone ..................... | 280/801.1 |
| 5,308,116 A | * | 5/1994 | Zawisa et al. ............. | 280/808 |
| 5,330,255 A | * | 7/1994 | Stawicki ..................... | 297/391 |
| 5,411,292 A | | 5/1995 | Collins et al. | |
| 5,468,020 A | * | 11/1995 | Scime ........................ | 280/808 |
| 5,678,887 A | * | 10/1997 | Sher ........................ | 297/250.1 |
| 5,931,503 A | * | 8/1999 | Glendon ..................... | 280/808 |
| 6,336,682 B1 | * | 1/2002 | Rosko ........................ | 297/483 |
| D464,562 S | * | 10/2002 | Reiter ........................ | D8/382 |
| 6,846,020 B1 | * | 1/2005 | Xu ............................ | 280/808 |
| 2001/0054839 A1 | | 12/2001 | Specht | |
| 2002/0158457 A1 | * | 10/2002 | Simmons ................. | 280/801.1 |
| 2005/0230953 A1 | * | 10/2005 | Kotter Lenders ........... | 280/808 |

FOREIGN PATENT DOCUMENTS

| | | | | |
|---|---|---|---|---|
| FR | 2685670 A1 | * | 7/1993 | |
| JP | 07165016 A | * | 6/1995 | |
| JP | 11180251 A | * | 7/1999 | |
| JP | 2001301507 A | * | 10/2001 | |

* cited by examiner

*Primary Examiner*—David R. Dunn
*Assistant Examiner*—Drew J. Brown
(74) *Attorney, Agent, or Firm*—Bill Panagos

(57) ABSTRACT

A low mount seat guide loop for a seat in a motor vehicle comprising a strap and a seatbelt restraint system. The low mount seat guide loop allows for easy re-attachment and access to a rear passenger compartment. It also provides the user with an improved ergonomic position for the seatbelt restraint system.

10 Claims, 5 Drawing Sheets

LOW MOUNT SEAT BELT GUIDE LOOP

FIELD OF INVENTION

This invention relates to seatbelt restraint systems. More specifically, it relates to a low mount seat guide loop for use with seatbelt restraint systems.

BACKGROUND OF INVENTION

Seatbelt restraint systems are required in new motor vehicles so as to help protect a vehicle occupant in case of collision. Today, there are demands on current seatbelt technology to improve seatbelt restraint systems to make them easier and more comfortable for users. Many improvements have been in the form of seat guide loops. These seat guide loops help to position the seatbelt across an occupant and many guide loops have special features to enhance occupant safety. See U.S. Pat. No. 4,549,770, U.S. Pat. No. 5,411,292, and U.S. Ser. No. 2001/0054839 A1 for examples.

However, in existing guide loop technology there are a few problems. Many of the guide loops are not easy for some occupant demographics to use. When the seatbelt restraint system falls behind an occupants' seat, it can be difficult to retrieve. Many are difficult to re-attach and make it difficult for occupants to access the rear of the passenger compartment from the front seat area. Many times, especially in smaller vehicles, there is tight packaging of the quarter trim of the car to seat and it is extremely challenging for an occupant to reach back and retrieve his or her seatbelt. Additionally, many of the guide loop systems are expensive because of the molding used to make them. Consumers have long wanted a seatbelt restraint system that utilizes a guide loop to solve these problems.

This low mount seat guide loop solves the above-mentioned problems by providing easy use for all occupant demographics. It allows for easy re-attachment and easy access of the rear passenger compartment while keeping costs down. It also keeps the seatbelt buckle in an improved ergonomic position. The closest known technology to this invention is a high mount guide loop, which does not present the seatbelt buckle in an ergonomic position.

SUMMARY OF INVENTION

Accordingly, to solve the above-mentioned problems, this invention relates to a low mount seat guide loop for a seat in a motor vehicle comprising a strap and a seatbelt restraint system. The strap further comprises fabric or any material generally used in the manufacturing of seats in motor vehicles and an elastic extension. This strap is positioned in a location easily accessed by both the seatbelt restraint system and by the occupant. The strap comprises a snap on one end. This snap further comprises a magnet. When the strap is extended and snapped into a predetermined location, the seatbelt restraint system is held into place. When the strap is retracted and snapped into a predetermined location the seatbelt restraint system is no longer held into place.

DETAILED DESCRIPTION OF THE DRAWINGS

DETAILED DESCRIPTION OF THE PREFERRED EMBODIMENT

Figure 1:
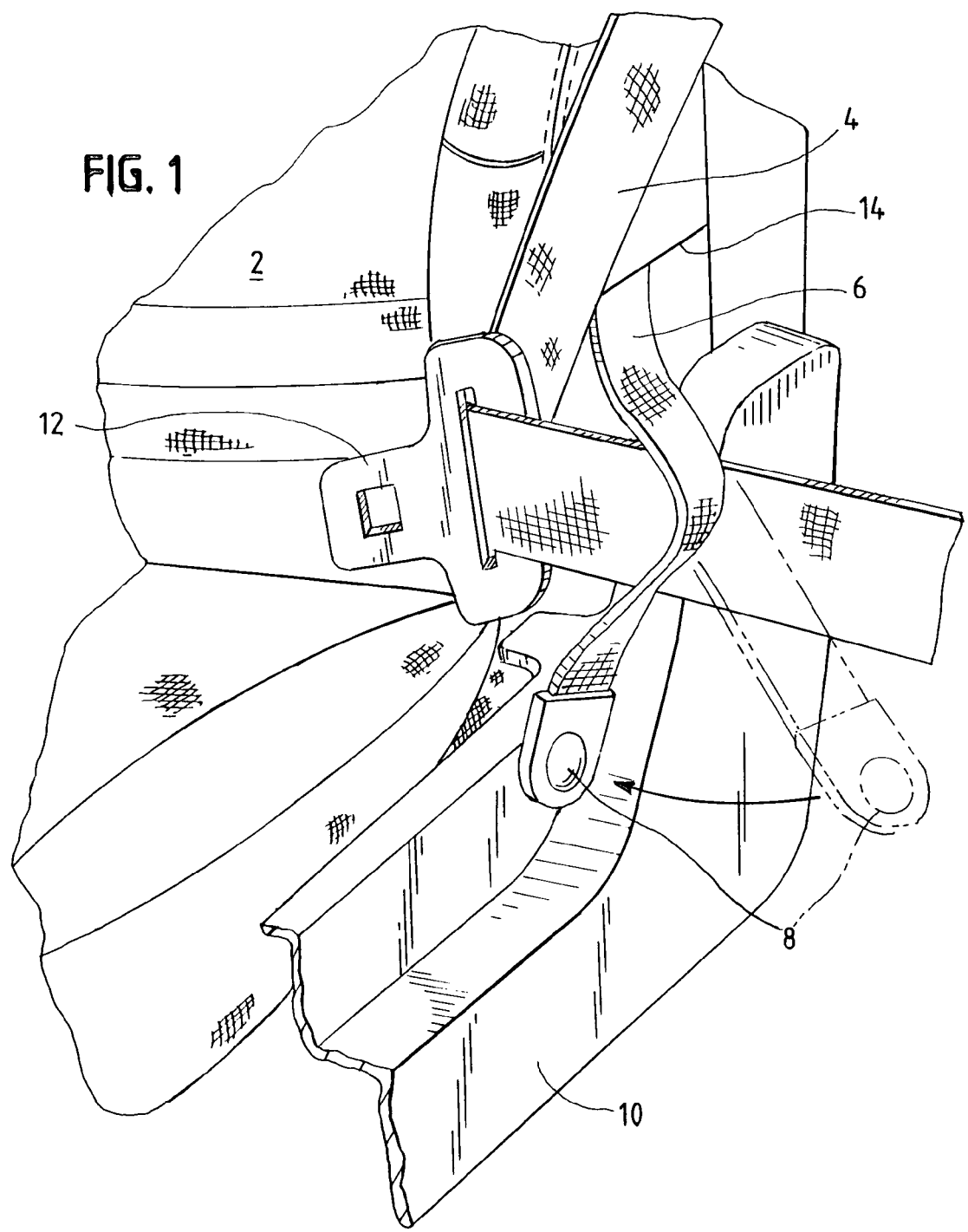
FIG. 1 depicts a view of the low mount seat guide loop as it holds the seat belt restraint system.
Figure 2:
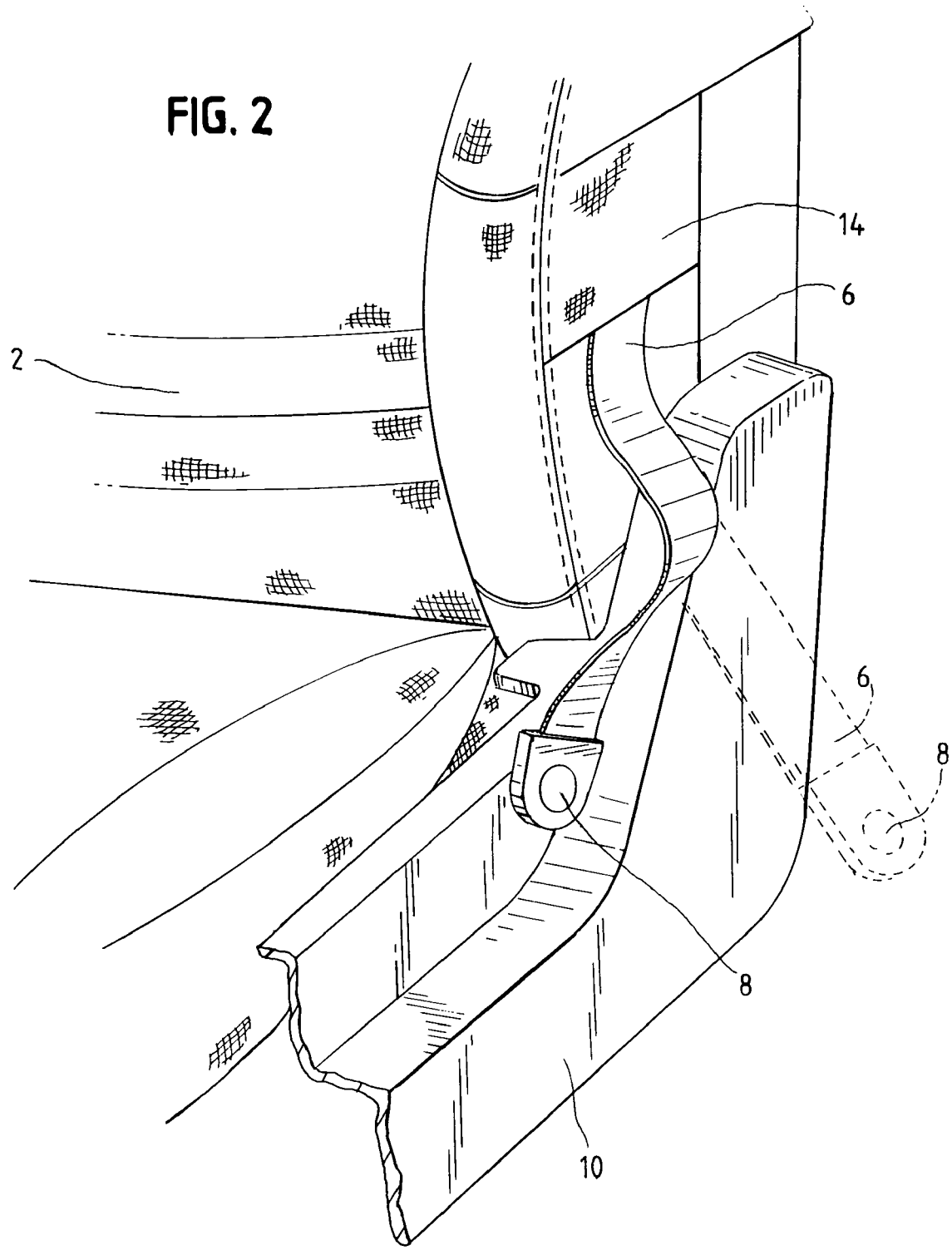
FIG. 2 depicts a view of the low mount seat guide loop without the seat belt restraint system.
Figure 4:
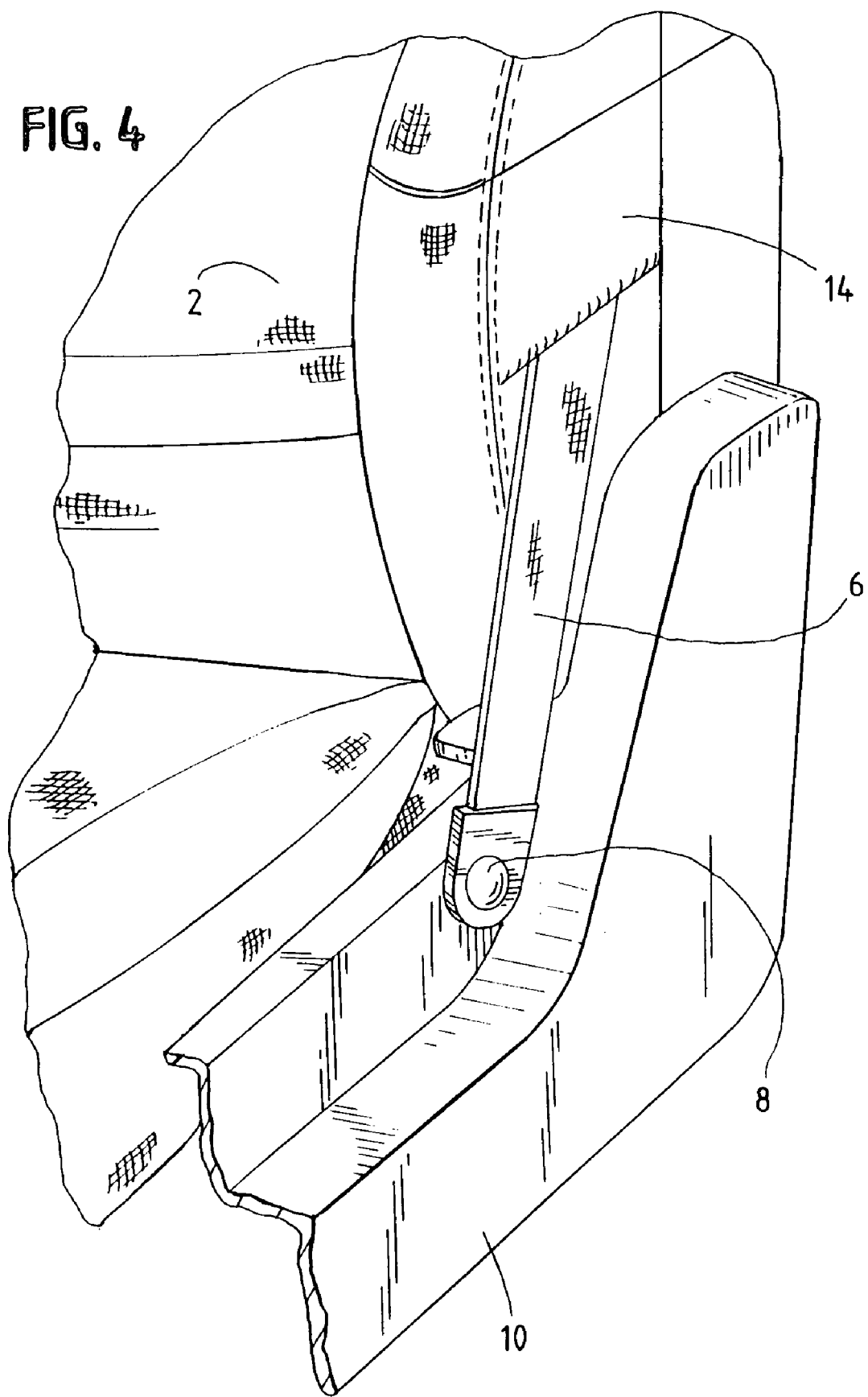
FIG. 4 depicts the low mount seat guide loop in its extended position.
Figure 5:
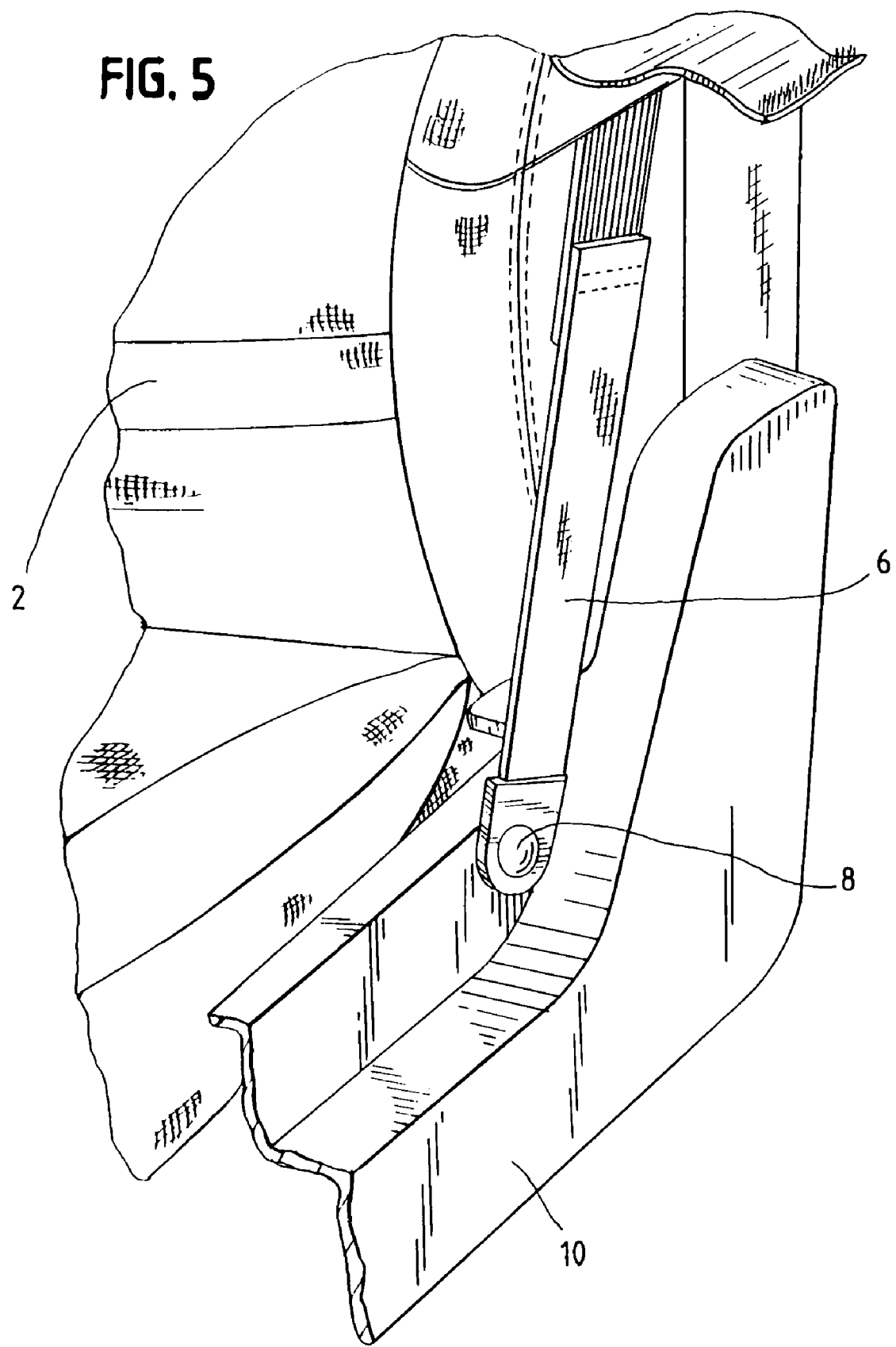
FIG. 5 depicts the low mount seat guide loop with its pocket lifted revealing the elastic extension.

As seen in FIG. 1, this low mount seat guide loop for a seat in a motor vehicle comprises a strap 6 and a seatbelt restraint system 4. The strap 6 is located in a position on the side of seat 2 and the side shield 10. This strap 6 comprises of fabric or any other commonly used material in seat manufacturing as well as an elastic extension 16 as seen in FIG. 5. One side of strap 6 is attached to the seat 2. The strap 6 further comprises a snap 8 located on its free end. This snap 8 further comprises a magnet so that the snap 8 and strap 6 will stay close to the seat 2 and side shield 10 and will not get caught in the door of a motor vehicle (not shown). The snap has at least two predetermined locations, extended and retracted as seen in FIG. 3 and FIG. 4.

FIG. 1 depicts the strap 6 as it is used with the seatbelt restraint system 4. One end of the strap 6 is attached to the side of the seat 2 and is then tucked under a pocket 14. The seatbelt restraint system is led under the strap 6 and the snap 8 is attached to its predetermined extended position on the side shield 10. When the seatbelt restraint system 4 utilizes this strap 6, a variety of current occupant problems are solved. The seatbelt restraint system 4 and its buckle 12 are held at a more comfortable and ergonomic position for the occupant. Additionally, if the occupant removes his or her seatbelt restraint system 4 for any reason while in the vehicle, the seatbelt restraint system 4 will remain in an easy to re-attach, easy to access position. The seatbelt restraint system 4 will not fall into the difficult to reach, tight area into the rear passenger seating area (not shown).

Figure 3:
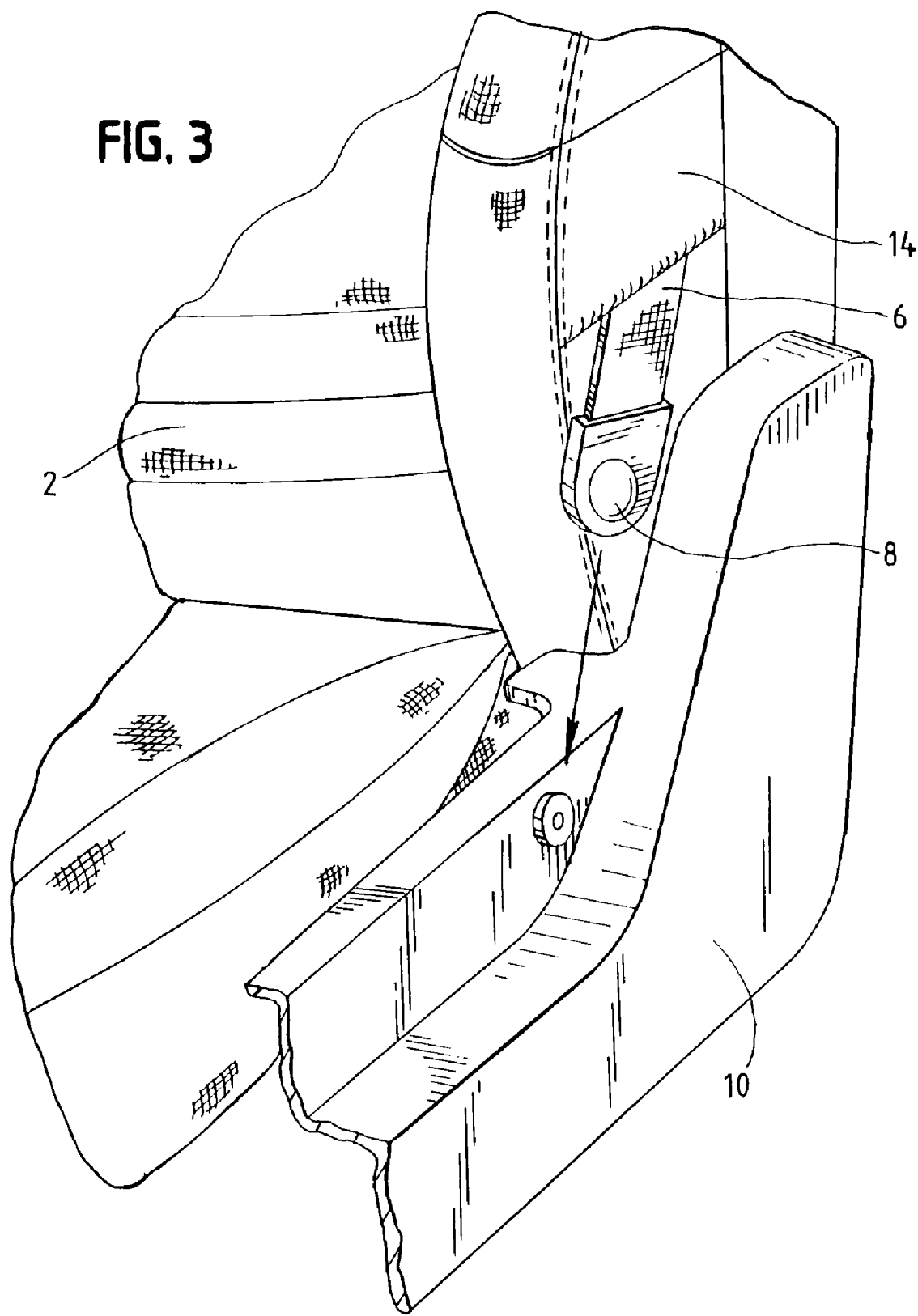
FIG. 3 depicts the low mount seat guide loop in its retracted position.

FIG. 3 depicts the easy to store retracted position of the strap 6 when the occupant no longer desires to use it. The strap 6 simply is tucked in the pocket 14 and snapped into its predetermined retracted position by the snap 8 on the side of the seat 2.

The strap 6 further comprises of an elastic extension 16 so as to provide a more secure fit of strap 6 over the seatbelt restraint system 4 and to ensure fit of strap 6 when the seat 2 is in its fully reclined position.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A low mount seat guide ioop for holding a seatbelt restraint of a vehicle seat, said low mount seat guide loop comprising:

a strap adapted for attachment to said seat such that the seatbelt restraint can be disposed between said strap and the vehicle seat; and a pocket into which said strap can be tucked, wherein said strap is adapted to be disposed in an extended position, in which said strap extends over the seatbelt restraint to hold the seatbelt restraint, and a retracted position, in which the seatbelt restraint can be removed from between said strap and the vehicle seat and said strap can be tucked into said pocket.

2. The low mount seat guide loop as set forth in claim 1, further comprising at least one snap for attaching said strap to the vehicle seat.

3. The low mount seat guide loop as in claim 2, wherein said snap further comprises a magnet.

4. The low mount seat guide loop as in claim 1, further comprising at least one snap, and wherein said strap is adapted to be attached to the vehicle seat via said snap when said strap is in the retracted position and in the extended position.

5. The low mount seat guide loop as set forth in claim 1, wherein said strap includes an elastic portion.

6. The vehicle seat assembly as set forth in claim 1, further comprising at least one snap, and wherein said strap is adapted to be fixed relative to said cushion via said snap when said strap is in the retracted position and in the extended position.

7. A vehicle seat assembly comprising:

a seatbelt restraint;

a cushion;

a strap adapted to be connected to said cushion and adapted to hold said seatbelt restraint by disposing said seatbelt restraint between said cushion and said strap; and a pocket into which said strap can be tucked, wherein said strap is adapted to be positioned in an extended position, in which said strap extends over said seatbelt restraint to hold said seatbelt restraint, and a retracted position, in which said seatbelt restraint can be removed from between said cushion and said strap and said strap can be tucked into said pocket.

8. The vehicle seat assembly as set forth in claim 7 further comprising at least one snap for fixing said strap relative to said cushion.

9. The vehicle seat assembly as set forth in claim 8, wherein said snap further comprises a magnet.

10. The vehicle seat assembly as set forth in claim 7, wherein said strap includes an elastic portion.

* * * * *

UNITED STATES PATENT AND TRADEMARK OFFICE
CERTIFICATE OF CORRECTION

PATENT NO. : 7,104,570 B2 Page 1 of 1
APPLICATION NO. : 10/736442
DATED : September 12, 2006
INVENTOR(S) : Hearn et al.

It is certified that error appears in the above-identified patent and that said Letters Patent is hereby corrected as shown below:

Column 2, line 55 delete "ioop" and insert therefor --loop--.

Signed and Sealed this

Twenty-third Day of September, 2008

JON W. DUDAS
*Director of the United States Patent and Trademark Office*